US005152484A

United States Patent [19]

Warner

[11] Patent Number: 5,152,484

[45] Date of Patent: Oct. 6, 1992

[54] ROLL-UP JACK STAND

[75] Inventor: Joseph G. Warner, Sterling Heights, Mich.

[73] Assignee: The United States of America as represented by the Secretary of the Army, Washington, D.C.

[21] Appl. No.: 787,806

[22] Filed: Nov. 4, 1991

[51] Int. Cl.[5] .............................................. F16M 13/00

[52] U.S. Cl. .................................... 248/158; 248/352; 254/94

[58] Field of Search ............... 248/158, 405, 407, 408, 248/409, 351, 352, 357; 254/94

[56] References Cited

U.S. PATENT DOCUMENTS

| | | | |
|---|---|---|---|
| 1,661,882 | 3/1928 | Derrick | 248/352 X |
| 1,666,971 | 4/1928 | McCarty | 254/94 |
| 3,744,757 | 7/1973 | White et al. | 254/94 |
| 4,813,843 | 3/1989 | Gilmour et al. | 254/94 X |
| 4,862,727 | 9/1989 | Bergeron | 254/94 X |
| 5,039,070 | 8/1991 | Warner | 254/94 |

*Primary Examiner*—Ramon O. Ramirez

*Attorney, Agent, or Firm*—Peter A. Taucher; David L. Kuhn

[57] ABSTRACT

My invention is a jack stand having a platform, a pair of uprights on the platform, a post swingable between the uprights, a vehicle engagement member at one end of the post, and a keeper releasably locking the post in a selected position. The keeper has a collar sliding on the post, fingers protruding from the collar, finger guiding rails connected to the uprights, and notches in the uprights which the fingers enter to lock the post in its selected position. The jack stand can have a clutch to arrest the post in a set position until the vehicle engages the jack stand. The jack stand can also have a mechanism to maximize resistance to rotation of the post as the jack stand attempts to leave its selected position. The mechanism may include a foot on the post interferingly engaging the platform as the post leaves the selected position. The mechanism can also include a connective linkage that operates to increase or maximize the arresting effect of the clutch just as the post departs the selected position.

16 Claims, 4 Drawing Sheets

ROLL-UP JACK STAND

GOVERNMENT USE

The invention described herein may be manufactured, used and licensed by or for the U.S. Government for governmental purposes without payment to me of any royalty thereon.

BACKGROUND

My invention is within the general class of mechanisms that raise part or all of a land vehicle off the ground. Specifically, my invention is a jack stand that uses the driving force of a vehicle to raise part of the vehicle. The closest prior art of which I am aware is U.S. Pat. No. 5,039,070 and the reference cited therein.

SUMMARY

My jack stand permits a vehicle to raise itself by driving forward or backward over the stand. The jack stand then permits the vehicle to lower itself by driving rearward or forward off the stand. The jack stand has a a ground engaging platform, a pair of opposed uprights fixed to the platform, a post assembly pivotally mounted between the uprights, a chassis engagement member at the free end of the post assembly, and a keeper mechanism for releasably locking the post in a vertical position. The keeper mechanism includes a collar sliding on the post assembly, fingers protruding from the collar, and rails upon which the fingers ride as the post assembly leaves or approaches the vertical position. The lock mechanism also includes a notch at the top of the upright into which the fingers fall to lock the post assembly in its vertical position.

Optionally, the jack stand has a clutch to arrest the post assembly in a manually set position in preparation for engagement with the jack stand. Additionally, the jack stand can have means for maximizing resistance to rotation of the post as the post attempts to leave its vertical position so that the vehicle does not roll off the jack stand under the influence of gravity. This feature enhances user safety when the user unlocks the post from the keeper in preparation for lowering the vehicle onto the ground. The maximizing means may include an elastomeric foot at the base of the post assembly, the foot interferingly engaging the platform as the post assembly leaves the vertical position. The maximizing means can also include a mechanism to increase or maximize the arresting effect of the clutch just as the post assembly departs the vertical position. It is contemplated that the driving force of the vehicle will be needed to overcome the maximized arresting effect of the clutch and roll the vehicle off the stand.

DETAILED DESCRIPTION

Figure 1:
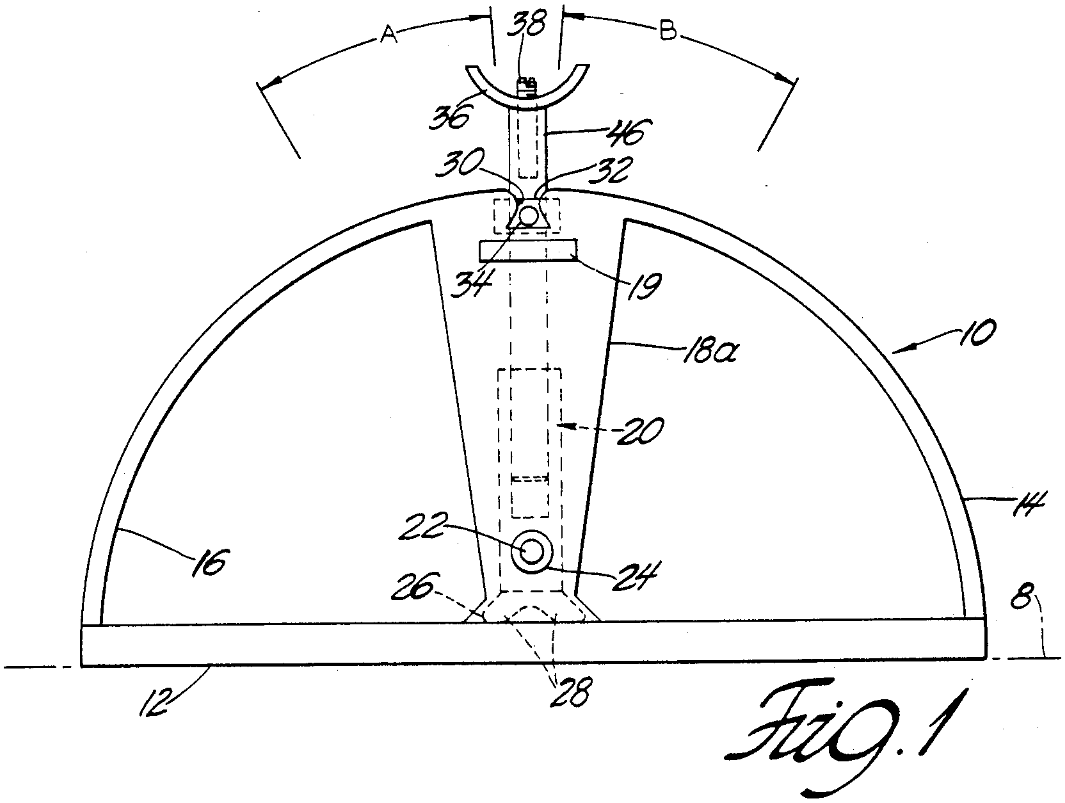
FIG. 1 is a side elevational view of my jack stand.
Figure 3:
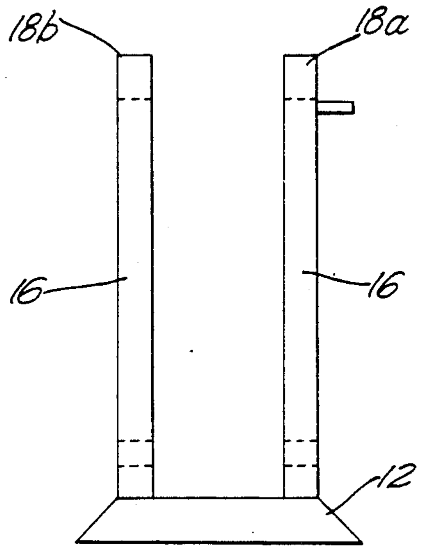
FIG. 3 is an end elevational view of an assembly of the platform, rails and uprights of my jack stand.

FIG. 1 shows a first embodiment of my roll up jack stand 10 resting upon a support surface 8 such as the ground. A flat platform or pedestal 12 lies upon the ground and fixedly supports parallel guides such as rails 14 and 16, rails 16 being additionally shown in FIG. 3. The rails are shown in an arcuate configuration but may have other configurations. For example, the rails could run straight, either horizontally or sloped with respect to platform 12, and the height of the rails at the center of jack stand 10 could be less, say one-third the height shown at the center of FIG. 1.

A pair of flat spaced uprights 18*a* and 18*b* lie in parallel planes and the tops of the uprights connect the pedestal 12 with the pairs of rails, which are also disposed in the parallel planes. The tops of the uprights are visible in FIG. 3. The uprights each have a specially shaped notch 30 for receiving radial keeper fingers 34 of collar 32, which translates along the upper portion of post assembly 20. Affixed to upright 18*a* just below notch 30 is ledge 19, which serves as a fulcrum for an elongate lever (not shown) used to force collar 32 upward on post assembly 20. Fingers 34 slide upon rails 14 or 16 as the post assembly swings. The post assembly is pivotally mounted between uprights 18 upon axis rod 22, either end of axis rod 22 having fastener rings 24 which retain rod 22 in the uprights. At the top of the post assembly is a cradle 36 and a retractable adapter pin 38 which are used to engage the axle or an undercarriage member of a vehicle (not shown).

Figure 7A:
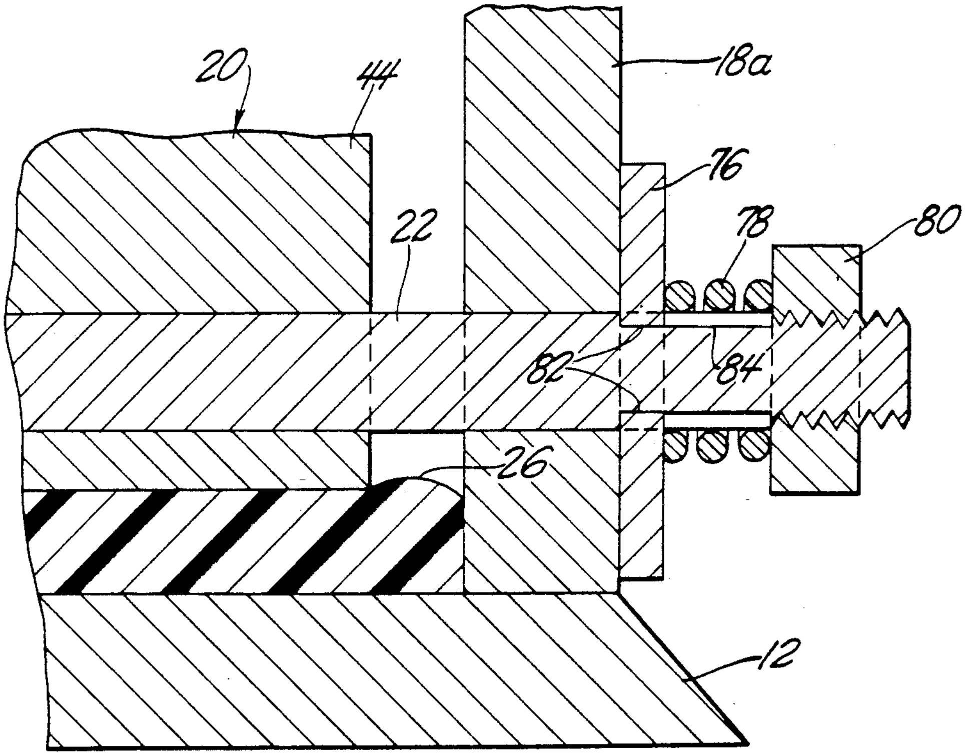
FIG. 7A is a partial lateral cross-sectional view of the jack stand showing an optional clutch mechanism.
Figure 8:
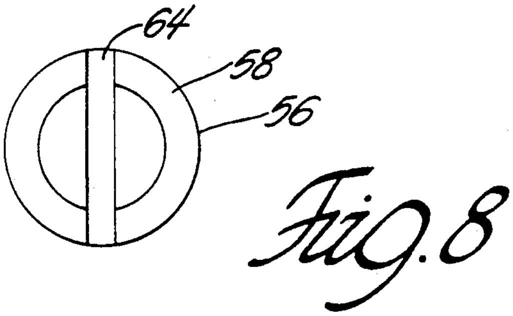
FIG. 8 is a top elevational view of an engagement pin of the jack stand.
Figure 7B:
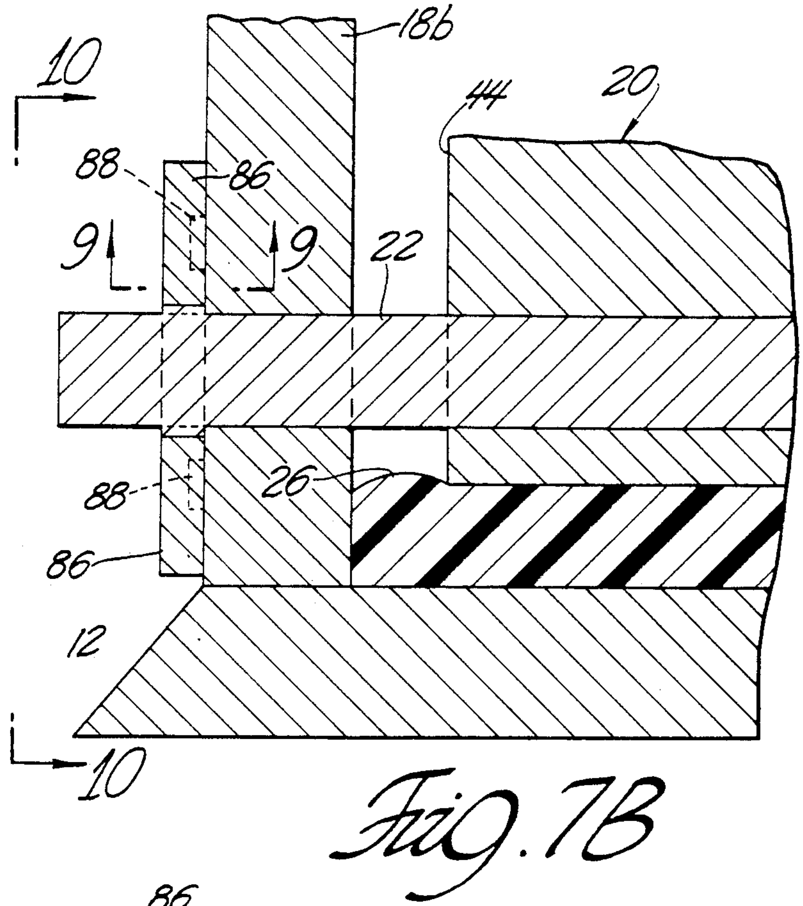
FIG. 7B is another partial lateral cross-sectional view of the jack stand showing an optional mechanism for increasing clutch plate pressure at a selected rotational position of the post assembly.
Figure 9:
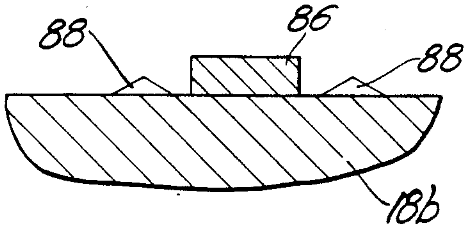
FIG. 9 is a view taken along line 9—9 in FIG. 7B.
Figure 10:
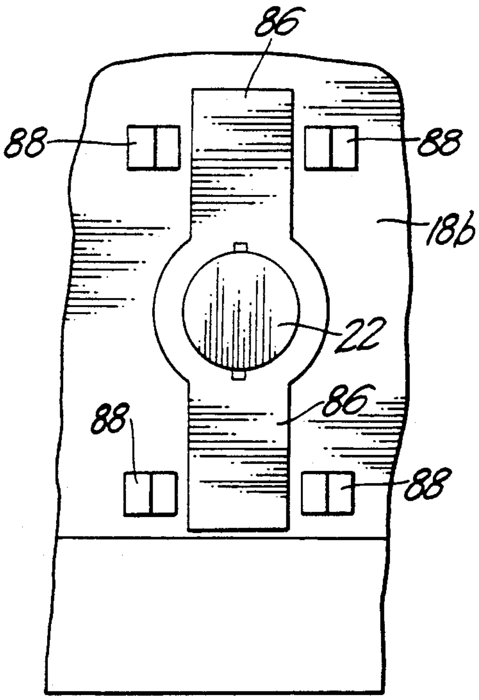
FIG. 10 is a view taken along line 10—10 in FIG. 7B.

Attached to the lower end of post assembly 20 is a bifurcated elastomeric foot 26, which is shown in an elastically compressed and deformed state in FIG. 1. Pivoting post assembly away from its FIG. 1 position further elastically compresses and deforms one of the bifurcations 28 against pedestal 12, so that force is required to pivot post assembly 20 away from its vertical position. It is contemplated that foot 26 will be squeezed sufficiently so that it will will bear against the inner wall surfaces of uprights 18*a* and 18*b* at least when post assembly 20 is within the the ranges of pivotal positions designated at "A" and "B" in FIG. 1. The configuration of foot 28 as it bears against the uprights is illustrated in FIGS. 7A and 7B. This configuration of foot 26 causes maximum resistance to pivoting of the post assembly for a specified range of movement just after the post assembly leaves an essentially vertical position.

Figure 4:
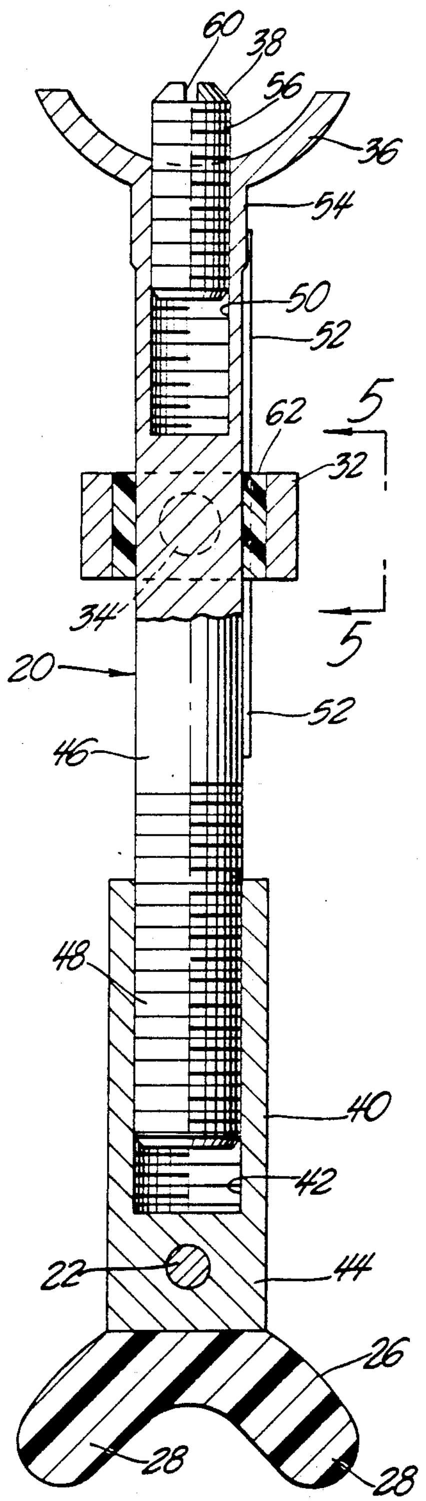
FIG. 4 is a sectional view of the post assembly for the jack stand.
Figure 5:
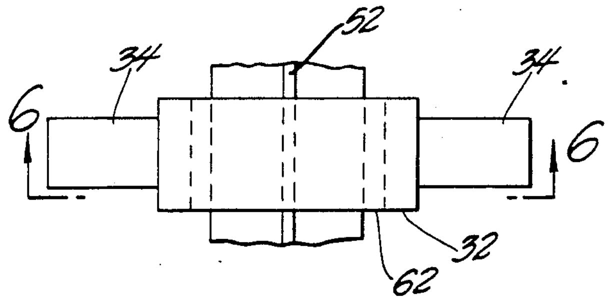
FIG. 5 is a view taken along line 5—5 in FIG. 4.
Figure 6:
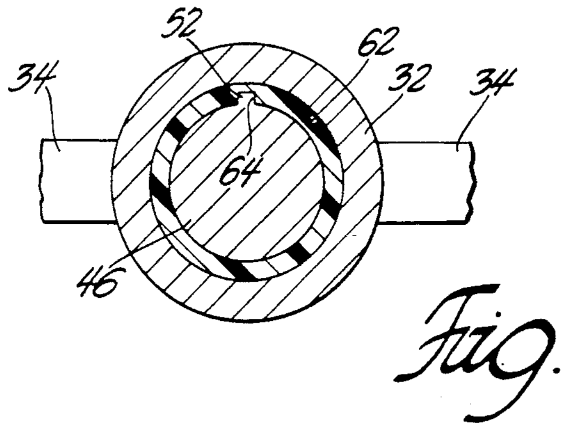
FIG. 6 is a view taken along line 6—6 in FIG. 5.

Referring now to FIG. 4, post assembly 20 has a cylinder 40 defining an internally threaded blind bore 42 and a base 44 at the blind end of the bore. The base is rotatable about axis rod 22 and has foot 26 attached to the bottom thereof. Inserted into cylinder 40 is shank 46 whose lower end 48 is threaded to mate with the threads of internal bore 42. The upper end of shank 46 defines internally threaded blind bore 50 and the intermediate portion of the shank has spline 52 running therealong parallel to the longitudinal axis of post assembly 20. At the upper end of shank 46 is an enlarged diameter portion 54 integral with cradle 36. Also at the upper end of the shank is adapter pin 38 which screws out of blind bore 50 to engage an undercarriage member of a vehicle. If cradle 36 is to receive the vehicle's axle or other undercarriage member, then pin 38 can be screwed completely into blind bore 50 so as not to affect engagement between the axle and cradle. The exposed end of pin 38 has an annular bevel 58 and has a diametrical slot 60 where the flat end of a tire iron fits when screwing the pin into or out of bore 50.

Translatable along shank 46 is collar 32 which has an elastomeric bushing 62 fixed therein. The bushing's inner diameter is sized so that collar 32 will slide easily along shaft 46 between the shank's threaded end 48 and the enlarged diameter portion 54 at the upper end of shank 46. Bushing 62 has a keyway 64 which loosely conforms to spline 52 so that collar 32 does not rotate on shank 46, whereby radial fingers 34 remain normally protruded through the general planes in which lie uprights 18*a* and 18*b*. When collar 32 is translated to the upper end of of shank 46, bushing 62 interferingly engages larger diameter portion 54 so that bushing is retained at portion 54 until positively removed therefrom. After positive removal of collar 32 from portion 54, collar 32 will again be free to slide along shank 46.

Figure 2:
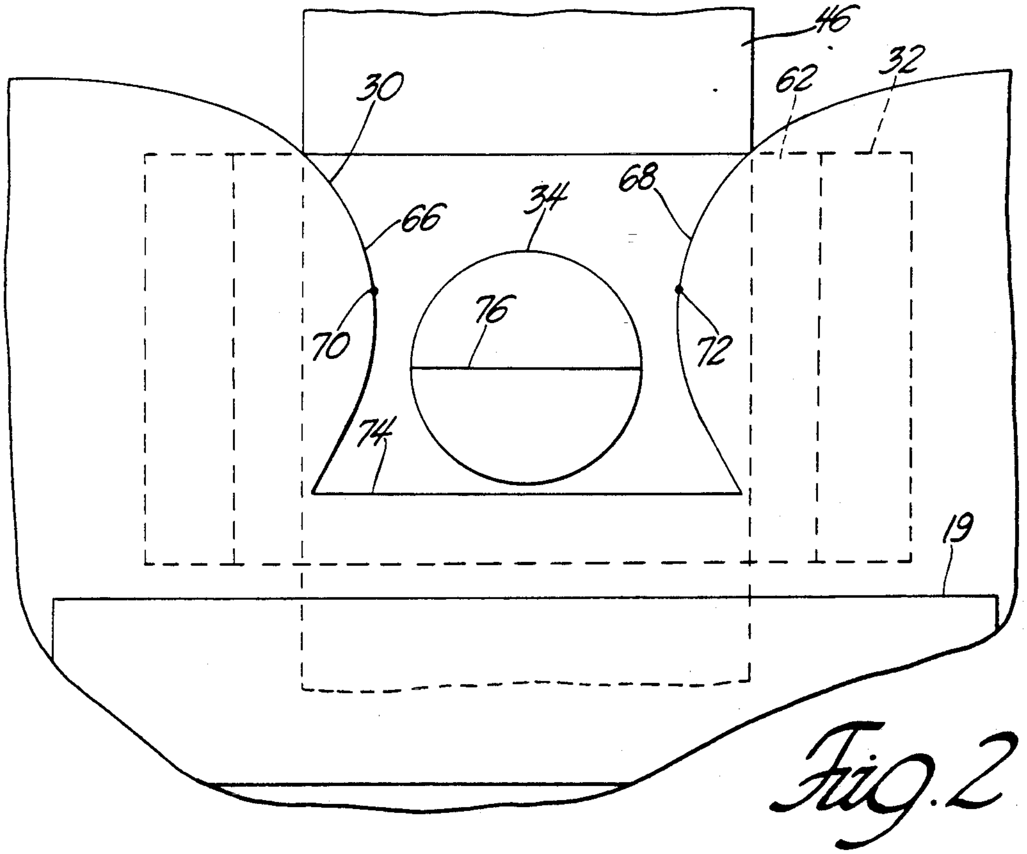
FIG. 2 is an enlarged view of the top of the upright seen in FIG. 1.

FIG. 2 shows a detail view of notch 30 when it is positioned on shank 46 so that finger 34 is in notch 30. Two opposed convex camming edges are defined by notch 30, these edges having opposing points 70 and 72 from which the edges diverge upward and downward. If post assembly 20 starts to pivot after finger 34 has dropped to the closed end 74, finger 34 comes into bearing contact with one of the opposed edges at a point below points 70 or 72. Finger 34 is forced against closed end 74 whereby the finger can not inadvertently escape from notch 30 and the post assembly is disabled from pivoting further. If post assembly 20 begins to pivot when diameter 76 is further from closed end 74 than points 70 and 72, then finger 34 is cammed out of notch 30 and post assembly can continue to pivot. In another manner of speaking, if even a slightly upwardly facing portion of finger 34 is below points 70 or 72 when post assembly 20 starts pivoting, then finger 34 is forced further into notch 30 and against closed end 74, whereby the finger stops the post assembly from further pivoting. Conversely, if even a slightly downwardly facing portion of finger 34 is above points 70 or 72 when post assembly 20 starts pivoting, then finger 34 is forced out of notch 30 and the post assembly will continue pivoting.

FIG. 7A shows an optional modification that can be made to the jack stand, wherein fastener 24 is replaced by a clutch assembly. The clutch assembly includes a clutch plate 76 frictionally bearing against a flat outward faced surface of upright 18*a*. Clutch plate 76 has teeth 82 that slide along groove 84 in axis pin 22 so that the clutch plate is translatable along the axis pin but does not rotate with respect to the axis pin. Compressed coil spring 78 presses clutch plate 76 against upright 18*a*, the degree of compression of the spring being adjustable by nut 80 threadingly engaged to axis pin 22. Post assembly 20 is not rotatable with respect to axis pin 22, so that clutch plate 76 and post assembly 20 rotate together.

The FIG. 7A embodiment is modified by structure in FIG. 7B, whose features are at the opposite end of rod 22 from the FIG. 7A features. A pair of flat arms 86 are fixed upon rod 22 so as to axially translate and rotate therewith, the arms bearing against upright 18*b*. It will be noted that the assembly of rod 22 and arms 86 can translate leftward in FIGS. 7A and 7B until spring 78 is completely compressed. Fixed to upright 18*b* are ramped bosses 88 which are disposed on either side of arms 86. Rotation of arms 86 brings the arms into engagement with one of the bosses. As arms 86 rotate over the bosses, the arms and rod 22 translate leftward as seen in FIGS. 7A and 7B, thereby compressing spring 78 and increasing the pressure of clutch plate 70 against upright 18 in FIG. 7A. Thus, as arms 86 pass over the bosses, there will be maximized resistance to rotation of post assembly 20 on axis pin 22. The bosses are placed so as to achieve this maximum resistance just as post assembly leaves its vertical position seen in FIG. 1. Thus post assembly 20 is safeguarded from leaving its vertical position when this assembly is supporting a vehicle.

OPERATION

To use jack stand 12, post assembly 20 is rotated to a selected position intermediate its vertical and horizontal positions so that cradle 36 or pin 38 can engage the undercarriage member of a vehicle. The clutch mechanism in FIG. 7A can be used to maintain post assembly 20 in the selected position. Collar 32 is slid down off enlarged diameter portion 54 until its fingers 34 rest on rails 14 or 16. The length of post assembly can be adjusted by turning shank 46 and pin 38 is retracted or deployed as necessary. After the undercarriage member engages cradle 36 or pin 38, the vehicle is driven over jack stand 12 so that post assembly 12 pivots to lift one end of the vehicle off the ground. When the post assembly reaches a vertical position, fingers 34 fall into notches 30, whereby the post assembly is locked in the vertical position.

When it is desired to take the vehicle off the jack, collar 32 is forced upward into engagement with enlarged diameter portion 54 of shank 46. Fingers 34 are moved upward at least far enough so that bearing force of the fingers against the edges of the notches will cam the fingers out of the notches. The bushing 62 inside collar 32 elastically interferes with enlarged diameter portion 54 so that the collar and fingers will not fall but still can be forced to translate along shank 46. The vehicle now drives forward or backward, the vehicle's driving force sufficing to cam the fingers out of the notches, overcome the resistance of foot 26 and overcome the resistance of the clutch mechanism shown in FIG. 7A. The vehicle continues to drive until it disengages cradle 36 or pin 38.

The vehicle's driving force overcomes the clutch mechanism's resistance even if the resistance is maximized by operation of arms 86 and bosses 88. However, the maximized resistance of the clutch mechanism is too much for the vehicle to overcome absent the driving force. Therefore gravity alone will not allow the vehicle to push post assembly 20 from its vertical position. Thus, once fingers 34 are manually pushed up to unlock the post assembly, the vehicle can not accidentally roll off the jack stand but must positively drive off the jack stand. It is also contemplated that the hardness and strength of foot 26 can be such that the vehicle's driving force would be necessary to overcome the foot's resistance to removal of the post assembly from a vertical position.

I wish it to be understood that I do not desire to be limited to the exact details of construction shown and described herein since obvious modifications will occur to those skilled in the relevant arts without departing from the spirit and scope of the following claims.

I claim:

1. A jack stand comprising:

a platform having a front end, a rearward end, an upper surface and an opposed lower surface;

an upright fixed to the platform, the upright having a notch;

a first guide running from the notch toward the rearward end of the platform;

a second guide running from the notch toward the front end of the platform;

a post having a free end, the post pivotingly connected to the jack stand and pivotable in a plane parallel to the upright;

means for engaging the undercarriage member of a vehicle, the engaging means disposed at a free end of the post;

a collar translatable along the post;

a finger engageble with the guides and the notches.

2. The jack stand of claim 1 including means to prevent rotation of the collar relative to the post.

3. The jack stand of claim 1 including means for inhibiting the post from pivoting away from an essentially vertical position, the inhibiting means comprising an elastomeric foot at a base of the post.

4. The jack stand of claim 3 wherein the foot elastically compresses against the platform and the upright as the post leaves the vertical position.

5. The jack stand of claim 1 including means for adjusting the length of the post, the adjusting means comprising:

a threaded base of the post;

a shank of the post, the shank threadingly engageble with the base and connected to the free end of the post;

wherein relative rotation between the shank and the base alters the length of the post.

6. The jack stand of claim 1 wherein:

the collar has an elastomeric inner bushing;

the post includes a first section having a reduced cross-sectional area such that the collar slides freely along the first section;

the post includes a second section having an enlarged cross-sectional area such that the inner bushing is elastically and interferingly engageble with the second section;

the second section is adjacent and above the first section.

7. The jack stand of claim 1 wherein the engaging means comprises:

a cradle connected to the free end of the post;

a engagement pin extendable through the cradle and retractable to a position within the post.

8. The jack stand of claim 1 further comprising:

clutch means for resisting pivoting of the post;

control means to adjust the degree of resistance of the clutch means.

9. The jack stand of claim 8 further comprising: inhibitor means for maximizing the degree of resistance of the clutch means at a selected rotational position of the post.

10. The jack stand of claim 1 further comprising:

a translatable axis pin passing rotatably through the upright, the axis pin rotating with the post;

a clutch plate bearing against a clutch engagement surface on the one upright, the clutch plate rotationally fixed relative to the axis pin but axially translatable with respect to the axis pin;

a biasing means for forcing the clutch plate against the one upright;

control means on the axis pin for varying an engagement force which the biasing means exerts on the clutch plate.

11. The jack stand of claim 10 including an inhibitor means for maximizing the engagement force when the post is at a selected rotational position, the inhibitor means comprising:

an opposing surface faced away from the clutch engagement surface;

an arm rotationally and axially fixed to the axis pin, the arm sliding upon the upright surface as the axis pin turns;

a protrusion on the opposing surface disposed in the rotational path of the arm.

12. A jack stand comprising:

a platform having a front end, a rearward end, an upper surface and an opposed lower surface;

an upright on the platform;

a first guide running from a top of the upright toward the rearward end of the platform;

a second guide running from the top of the upright toward the front end of the platform;

a post pivotingly connected to the jack stand, the post pivotable from a vertical position toward both the front end and the rearward end;

means for inhibiting the post from pivoting away from an essentially vertical position, the inhibiting means comprising an elastomeric foot at a base of the post, wherein the foot elastically compresses against the platform as the post leaves the vertical position.

13. The jack stand of claim 12 further comprising:

a translatable axis pin passing through the upright;

a clutch plate bearing against a clutch engagement surface on the upright, the clutch plate rotationally fixed relative to the post and axially translatable with respect to the axis pin;

a biasing means for forcing the clutch plate against the one upright;

control means on the axis pin for varying an engagement force which the biasing means exerts on the clutch plate.

14. The jack stand of claim 13 including an inhibitor means for maximizing the engagement force when the post is at a selected rotational position, the inhibitor means comprising:

an opposing surface faced away from the clutch engagement surface;

an arm rotationally fixed relative to the post and axially fixed relative to the axis pin, the arm sliding upon the upright surface as the post pivots;

a sloped boss on the opposing surface disposed in the rotational path of the arm.

15. A jack stand comprising:

a platform having a front end, a rearward end, an upper surface and an opposed lower surface;

an upright on the platform;

a first guide running from a top of the upright toward the rearward end of the platform;

a second guide running from the top of the upright toward the front end of the platform;

a post pivotingly connected to the jack stand, the post pivotable from a vertical position toward both the front end and the rearward end.

frictional engagement means for resisting pivoting of the post from any rotational position, the frictional engagement means preventing gravity from pivoting the post;

control means to adjust the degree of resistance of the frictional engagement means.

16. The jack stand of claim 15 further comprising: inhibitor means for maximizing the degree of resistance of the frictional engagement means at a selected rotational position of the post.

* * * * *